United States Patent [19]
Inoue

[11] Patent Number: 5,993,144
[45] Date of Patent: Nov. 30, 1999

[54] COMPLEX-TYPE ARTICLE CONVEYING APPARATUS

[75] Inventor: Masahiko Inoue, Anjo, Japan

[73] Assignee: Toyotomi Kiko Co., Ltd., Anjo, Japan

[21] Appl. No.: 08/999,226

[22] Filed: Dec. 29, 1997

[30] Foreign Application Priority Data

Jun. 12, 1997 [JP] Japan ................................. 9-193008

[51] Int. Cl.$^6$ ................................................. B65G 65/08
[52] U.S. Cl. ............................... 414/752; 294/65; 901/40
[58] Field of Search .................................. 414/749–753,
414/627, 226.01; 294/65.5, 64.1, 65; 198/468.3;
901/15, 40

[56] References Cited

U.S. PATENT DOCUMENTS

| | | | |
|---|---|---|---|
| 4,648,786 | 3/1987 | Sakaurai | 414/752 |
| 4,715,114 | 12/1987 | Yajima | 414/226.01 |
| 4,911,598 | 3/1990 | Sarvary et al. | 414/226.01 |
| 5,065,337 | 11/1991 | Hara | 901/15 X |
| 5,130,631 | 7/1992 | Gordon et al. | 901/15 X |
| 5,271,757 | 12/1993 | Houben | 414/733 X |
| 5,575,376 | 11/1996 | Colamussi | 294/65 X |

FOREIGN PATENT DOCUMENTS 4-42390  2/1992  Japan .

*Primary Examiner*—Donald W. Underwood
*Attorney, Agent, or Firm*—Oliff & Berridge, PLC

[57] ABSTRACT

In a conveying apparatus for conveying works between a first lower die and a second lower die in a press machine, a distal end portion of a multi-joint robot is connected to a linear shaft body, and the linear shaft body carries a linearly reciprocating body movable in the directions of the length of the linear shaft body. The linearly reciprocating body is connected to a first detachable holding device that holds a first work. The linear shaft body is connected to a second detachable holding device that holds a second work. The first work is transferred by motion of the linear shaft body and the motion of the linearly reciprocating body carrying the first holding device, and the second work is transferred by motion of the linear shaft body alone. The holding of the first work and the holding of second work are started approximately at the same timing, but the releasing of the first work and the releasing of the second work are performed at different timings in accordance with the positions at which their conveyances are completed.

9 Claims, 6 Drawing Sheets

COMPLEX-TYPE ARTICLE CONVEYING APPARATUS

The entire disclosure of Japanese Patent Application No. Hei 9-193008 filed on Jun. 12, 1997 including the specification, drawings and abstract is incorporated herein by reference in its entirety.

BACKGROUND OF THE INVENTION

1. Field of the Invention

The present invention relates to a complex-type article conveying apparatus that serves an effective measure for efficiently automatizing conveyance between steps of, for example, a press processing that includes several steps, wherein a work is taken out of a press machine in a preceding step, and moved to and set in a press machine in the next step.

2. Description of the Related Art

A thin steel sheet-pressed form having a three-dimensional free-form surface, such as one used as an exterior sheet member of a motor vehicle, is shaped from a flat sheet material through several processing steps, such as drawing, exterior shape punching, bending, piercing and the like.

During such a press process, it is necessary to perform an operation of taking a work out of a small clearance between an upper die and a lower die of each step and conveying the work to and setting it into a small clearance between an upper die and a lower die of the next step (hereinafter, this operation will be referred to as "inter-step conveyance").

Various mechanisms have recently been developed for automatizing the inter-step conveyance for the purpose of improvements in productivity, quality and safety and the like.

The construction of a conventional technology developed for such a purpose (disclosed in Japanese Utility Model Laid-Open No. Hei 4-42390) will be described below with reference to FIGS. 13, 14, 15 and 16.

Figure 13:
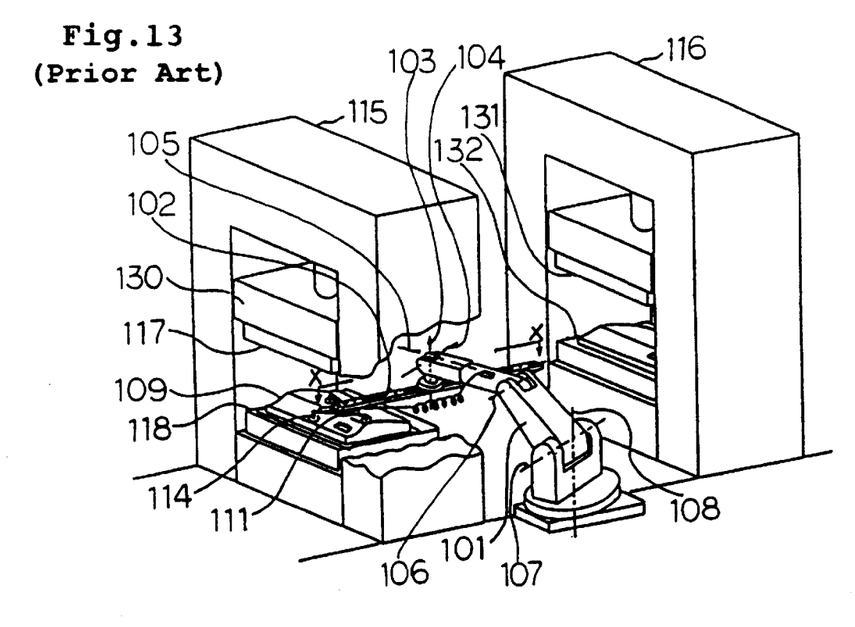
FIG. 13 illustrates the overall construction of a conventional article conveying apparatus.

Referring to FIG. 13, a six-axis multi-joint automatic motion mechanism 101 is designed so that shafts 103–108 are automatically driven in their respective rotating directions, and stopped and controlled in rotational angle in accordance with pre-instructed amounts and timings.

Figure 15:
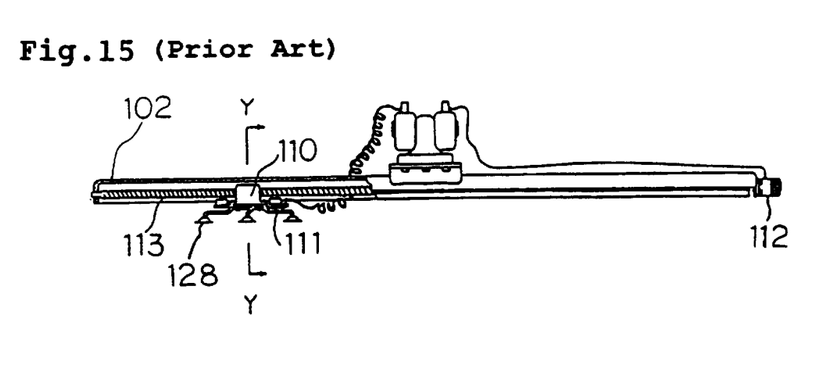
FIG. 15 shows a holding device, a linear shaft body and a linearly reciprocating body of the conventional article conveying apparatus.

As shown in FIG. 15, a linear shaft body 102 is provided with a linear reciprocating body 110 that moves along the linear shaft body 102. The linear reciprocating body 110 is driven, stopped and position-controlled over substantially the entire length of the linear shaft body 102. A work holding device 111 is guided by the linear reciprocating body 110 to move back and forth along the linear shaft body 102.

Figure 16:
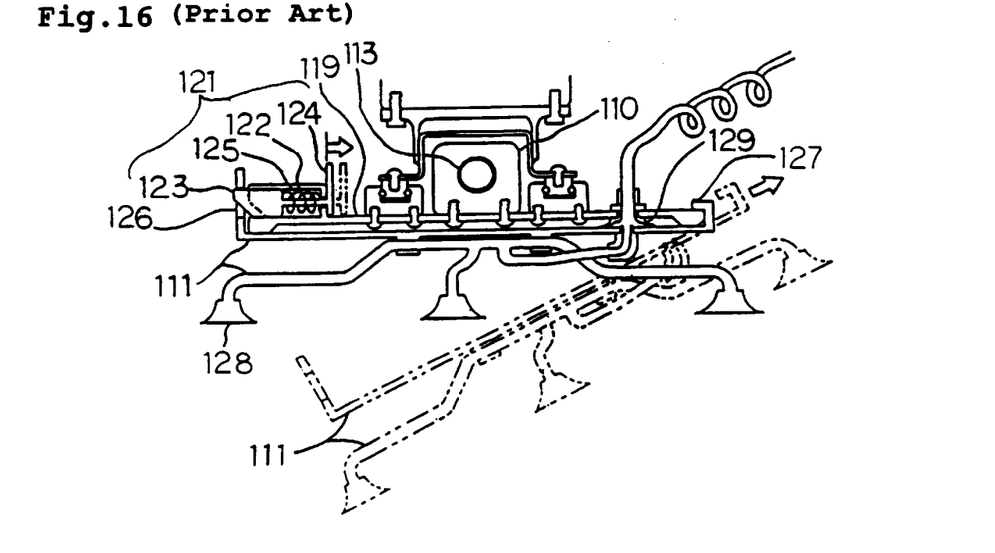
FIG. 16 illustrates the attachment and detachment of the holding device of the conventional article conveying apparatus.

As shown in FIG. 16, the work holding device 111 holds a work by suction due to negative pressure air. The work holding device 111 is detachably engaged with a base 119 by hooking a hook portion 127 formed on one end of the work holding device 111 onto the corresponding end of the base 119, and engaging the opposite end of the work holding device 111 with the corresponding end of the base 119 using a lock mechanism 121 formed of a spring 122, a slide block 123, an unlocking piece 124 and a guide groove 125. Both the base 119 and the holding device 111 have ends of negative pressure air channels communicating with suction cups 128 of the holding device 111. The channel ends of the base 119 and the holding device 111, facing each other, are sealed from external air by deflection of a seal packing 129 disposed on the base 119.

The operation of this conventional technology will be described below.

Figure 14:
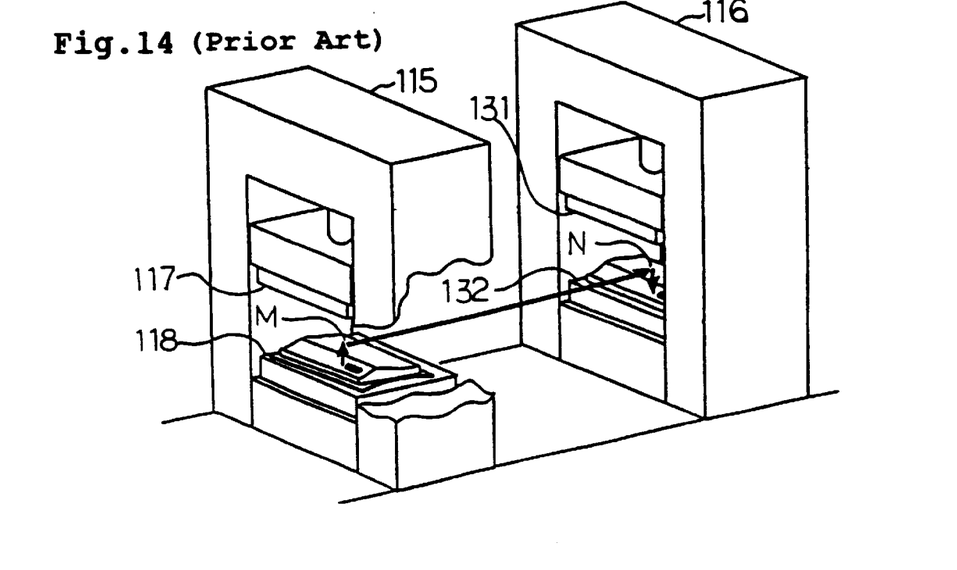
FIG. 14 illustrates the operation of the conventional article conveying apparatus.

Referring to FIGS. 13 and 14, to take out a work, a forward half portion of the linear shaft body 102 (a left-side half portion in FIG. 13) is inserted into a clearance between an upper die 117 and a lower die 118 of a press machine 115 of a preceding step to move a forward end thereof to a position over the work 109 placed on the lower die 118.

The linear shaft body 102 is subsequently moved downward by operations of the rotating shafts 103–108, until the holding device 111 contacts the work 109, so that the holding device 111 holds the work 109.

The linear shaft body 102 is raised to a position M over the lower die 118 in such a manner that both the work 109 and the linear shaft body 102 do not interfere with the upper die 117 nor the lower die 118, thereby completing the takeout operation.

Then, to move the taken-out work 109 to a position immediately over a lower die 132 of a press machine of the next step, a rear end portion of the linear shaft body 102 (a right-side end portion in FIG. 13) is moved linearly from the takeout completed position to a position N over the lower die 132.

During this movement, the holding device 111, assuming a position near a forward end portion of the linear shaft body 102 at the time of completion of the takeout operation, moves to a rear end portion of the linear shaft body 102, through guidance by the linearly reciprocating body 110 moving in accordance with pre-instructed motion, while holding the work 109.

Then, the rotating shafts 103–108 are operated to lower the linear shaft body 102, and the holding device 111, having moved to the rear end portion of the linear shaft body 102, opens to allow the work 109 to fall onto the lower die 132.

After the work 109 is set in, the apparatus returns to the previous position by reversely following the loci of movements up to the setting of the work 109, thereby completing the inter-step conveying operation.

There is a case where during the inter-step conveyance, two works are discharged from a single press machine and transferred to different positions (that is, a work at a first position in the press machine is transferred to a second position outside the press machine, and the other work at a third position in the press machine is transferred to a fourth position outside the press machine).

In such a case, the inter-step conveying apparatus needs to perform the takeout-transfer action twice since the inter-step conveying apparatus is able to hold only one work at a time. Therefore, the conventional art has a problem of a long operating time of the inter-step conveying apparatus.

Accordingly, it is an object of the present invention to reduce the operating time of an inter-step conveying apparatus in a case where two works are discharged from a single press machine and transferred to different positions.

Furthermore, there is another case where press dies for two steps are disposed in a single press machine with a work-conveying in-die transfer apparatus provided between the dies, in order to reduce the number of press machines.

The in-die transfer apparatus moves a work from a location X in the press machine to a location Y in the same press machine. Thereby, it becomes possible to perform two pressing steps in a press machine by pressing a work at the location X in the press machine, moving the work to the location Y in the same press machine, and pressing the work at the Y location.

However, such in-die transfer apparatuses are provided as dedicated apparatuses in individual press machines, or an in-die transfer apparatus is dedicated to the press dies for two steps disposed in a single press machine, thereby producing a problem of increased costs of dedicated equipment.

Accordingly, it is another object of the present invention to enable a press machine to perform two pressing steps without an increase in dedicated equipment for press machines or press dies.

It is still another object of the present invention to enhance the general versatility of a conveying apparatus by facilitating replacement of individual holding devices.

It is a further object of the present invention to make it possible to set one work to a desired position while holding and conveying another work.

SUMMARY OF THE INVENTION

To achieve the aforementioned objects, according to one aspect of the present invention, there is provided a complex-type article conveying apparatus including a linear shaft body movable by an external motion mechanism, and a linearly reciprocating body movable along the linear shaft body. A first holding device is provided on the linearly reciprocating body and is capable of holding an article to be conveyed. A second holding device is provided at an end of the linear shaft body and is capable of holding an article to be conveyed. Synchronously with an operation in which an article that has been at a first location is held by the first holding device and moved to a second location in accordance with a motion of the linearly reciprocating body along the linear shaft body and a motion of the linear shaft body driven by the external motion mechanism, another article that has been at a third location is held by the second holding device and moved to a fourth location in accordance with the motion of the linear shaft body driven by the external motion mechanism. The first location, the second location, the third location and the fourth location are arranged non-equidistantly.

While an article held by the first holding device is being moved from the first location to the second location in accordance with the motion of the linear shaft body and the motion of the linear reciprocating body carrying the first holding device, another article held by the second holding device is synchronously moved from the third location to the fourth location in accordance with the motion of the linear shaft body supporting the second holding device. Therefore, through a single action of the linear shaft body provided in the article conveying apparatus (that is, a single takeout-transfer action), the article at the first location and the article at the third location can be simultaneously transferred.

According to another aspect of the present invention, there is provided a complex-type article conveying apparatus including a linear shaft body movable by an external motion mechanism, and a linearly reciprocating body movable along the linear shaft body. A first holding device is provided on the linearly reciprocating body and is capable of holding an article to be conveyed. A second holding device is provided at an end of the linear shaft body and is capable of holding an article to be conveyed. Synchronously with an operation in which a first article that has been at a second location is held by the first holding device and moved to a third location in accordance with a motion of the linearly reciprocating body along the linear shaft body and a motion of the linear shaft body driven by the external motion mechanism, a second article that has been at a first location is held by the second holding device and moved in accordance with the motion of the linear shaft body driven by the external motion mechanism, to the second location, which is vacant since the first article was held by the first holding device and removed by the conveying action of the linearly reciprocating body. The first location, the second location and the third location are arranged non-equidistantly on a continuous conveyance path.

While a first article held by the first holding device is being moved from the second location to the third location in accordance with the motion of the linear shaft body and the motion of the linear reciprocating body carrying the first holding device, a second article held by the second holding device is synchronously moved from the first location to the second location in accordance with the motion of the linear shaft body supporting the second holding device. More specifically, since the second location in a press machine becomes vacant when the first article is taken out by the linearly reciprocating body moving along the linear shaft body and the linear shaft body being moved by the external motion mechanism, the second article at the first location in the press machine can be moved to the vacant second location.

The first holding device and the linearly reciprocating body may be detachably connected, and the second holding device and the linear shaft body may be detachably connected.

In this optional construction, the first holding device and the linearly reciprocating body are connected by locking a lock mechanism. The first holding device can be separated from the linearly reciprocating body by unlocking the lock mechanism. The second holding device and the linear shaft body are connected by locking another lock mechanism. The second holding device can be separated from the linear shaft body by unlocking the lock mechanisms. The lock device may be similar to the one as shown in FIG. 16.

The timing of article holding and releasing actions of the first holding device and the timing of article holding and releasing actions of the second holding device may be controllable differently from each other.

While an article held by the first holding device is being conveyed in accordance with the motion of the linear shaft body and the motion of the linear reciprocating body carrying the first holding device, another article held by the second holding device is synchronously conveyed in accordance with the motion of the linear shaft body supporting the second holding device. While the article held by the first holding device is being conveyed, the other article is set into a predetermined position by causing the second holding device to release the article.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A first preferred embodiment of the present invention will be described in detail with reference to FIGS. 1 to 6.

Figure 1:
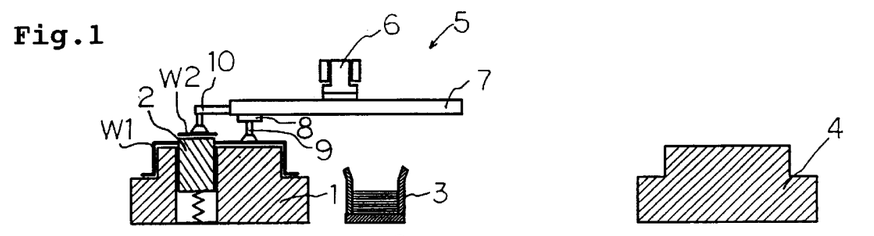
FIG. 1 is a side view of a portion of an article conveying apparatus of a first embodiment of the present invention, illustrating a first step of the apparatus.

Referring to FIG. 1, a lower portion of a press machine is constituted by a lower die 1 for forming a work W1. A pressurizing member 2 urged vertically upward by an elastic member is disposed in a central portion of the lower die 1.

Since the pressurizing member 2 is urged vertically upward, a work W2 placed on the pressurizing member 2 is positioned vertically higher than the work W1 placed on the lower die 1.

A stacker 3 for storing works W2 formed by the press machine is disposed near the lower die 1.

Another lower die 4 is disposed apart from the lower die 1. The work W1 formed by the press machine (the lower die 1) is set into the lower die 4 to press the work W1.

A conveying apparatus 5 for conveying the work W1 and the work W2 is disposed vertically upward from the press machine (the lower die 1). The conveying apparatus 5 has a six-axis multi-joint robot 6, a linear shaft body 7, a linearly reciprocating body 8, a first holding device 9, and a second holding device 10.

A distal end portion of the six-axis multi-joint robot 6 is connected to a substantially central portion of the linear shaft body 7. The multi-joint robot 6 operates not only to move the linear shaft body 7 to any desired position in three dimensions but also to rotate the linear shaft body 7 by any desired angle in any direction.

The linearly reciprocating body 8 is disposed on the linear shaft body 7. The linearly reciprocating body 8 can be moved and stopped over substantially the entire length of the linear shaft body 7, and is accordingly controlled in position. As in the conventional art shown in FIG. 15, the linearly reciprocating body 8 in this embodiment has a female thread screwed onto a screw that is driven by a servo motor. In accordance with rotations of the screw, the linearly reciprocating body 8 reciprocates in the directions of length of the screw (that is, the directions of the length of the linear shaft body 7).

The method of driving the linearly reciprocating body 8 is not limited to aforementioned technology, but may employ an air cylinder, a combination of a motor pulley and a belt, and the like.

The linearly reciprocating body 8 carries the first holding device 9 that holds the work W1 by suction due to negative pressure air. The first holding device 9 may be, for example, a holding device as shown in FIG. 16.

The linearly reciprocating body 8 and the first holding device 9 are interconnected by a lock mechanism fixed to the linearly reciprocating body 8. The lock mechanism is formed by a slide block urged in a locking direction by a spring, a releasing piece for pushing the slide block in an unlocking direction against the spring force, and a guide groove guiding the slide block.

The linearly reciprocating body 8 has ends of negative pressure air channels that face the corresponding channel ends in the first holding device 9, so that negative pressure air is supplied from the linearly reciprocating body 8 to the first holding device 9.

The second holding device 10 for holding the work W2 by suction due to negative pressure air is disposed on an end of the linear shaft body 7. The second holding device 10 may be, for example, a holding device as shown in FIG. 16.

The linear shaft body 7 and the second holding device 10 are interconnected by fitting a protrusion (not shown) of the second holding device 10 into a recess (not shown) of the linear shaft body 7 and fixing them at a single-action lock portion (not shown).

The linear shaft body 7 has ends of negative pressure air channels that face the corresponding channel ends in the second holding device 10, so that negative pressure air is supplied from the linear shaft body 7 to the second holding device 10.

Since the first and second holding devices 9, 10 are detachably connected at their respective positions, it is easy to replace them in accordance with the shapes of various works to be conveyed.

The operation of the first embodiment of the present invention will be described below.

Figure 5:
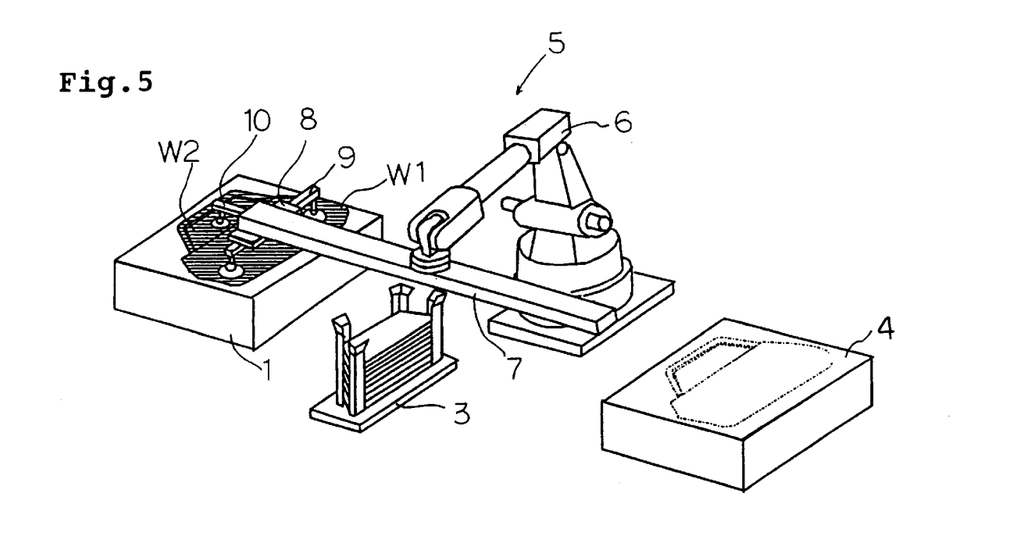
FIG. 5 is a perspective view of a portion of the article conveying apparatus of the first embodiment of the present invention, illustrating the first step thereof.

In a first step illustrated in FIG. 1 and FIG. 5, the conveying apparatus 5 is moved to a position above the lower die 1 by the multi-joint robot 6. The first holding device 9 connected to the linearly reciprocating body 8 holds the work Wl, and the second holding device 10 connected to the linear shaft body 7 holds the work W2.

Figure 2:
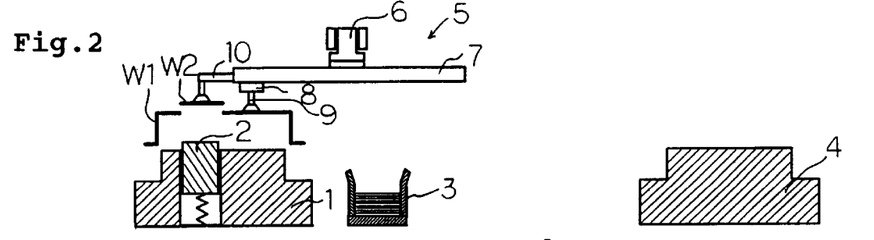
FIG. 2 is a side view illustrating a second step of the article conveying apparatus of the first embodiment of the present invention.

In a second step illustrated in FIG. 2, the conveying apparatus 5 is moved vertically upward.

Figure 3:
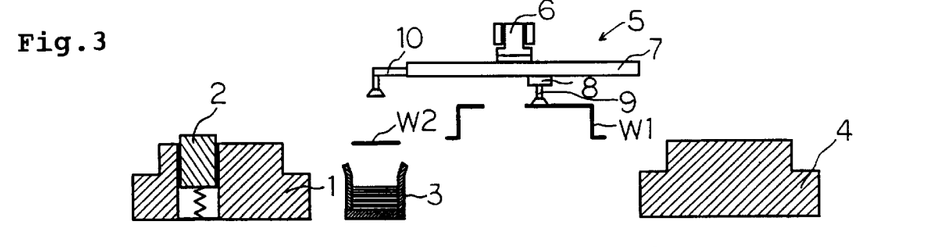
FIG. 3 is a side view illustrating a third step of the article conveying apparatus of the first embodiment of the present invention.
Figure 6:
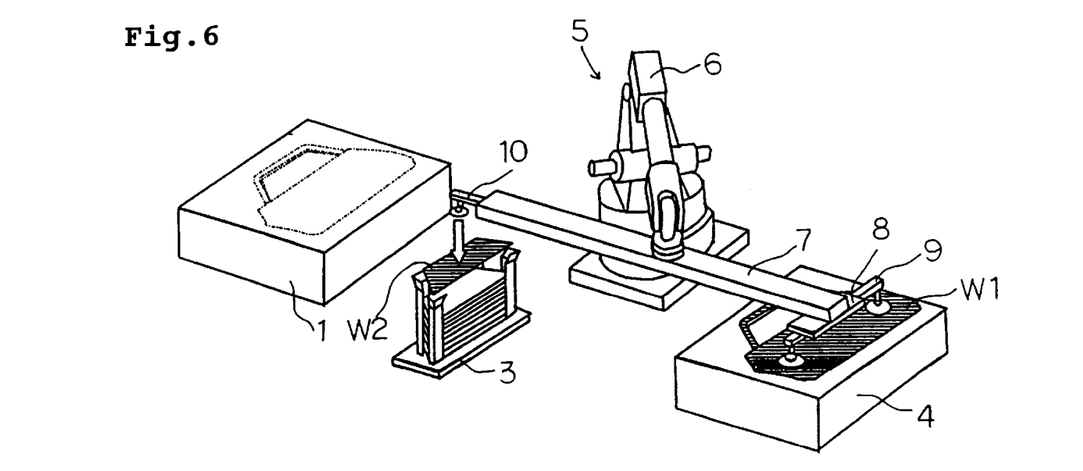
FIG. 6 is a perspective view illustrating the third step of the article conveying apparatus of the first embodiment of the present invention.

In a third step illustrated in FIG. 3 and FIG. 6, the linear shaft body 7 is moved toward the lower die 4 by the multi-joint robot 6 and, synchronously, the linearly reciprocating body 8 is moved relative to the linear shaft body 7, toward the lower die 4. When the second holding device 10 connected to the linear shaft body 7 reaches a position over the stacker 3, the second holding device 10 is caused to release the work W2.

At the time of release of the work W2 from the second holding device 10, the first holding device 9 connected to the linearly reciprocating body 8 continues holding and conveying the work W1. Thus, the time control of article holding and releasing actions of the first holding device 9 is different from the time control of article holding and releasing actions of the second holding device 10.

Figure 4:
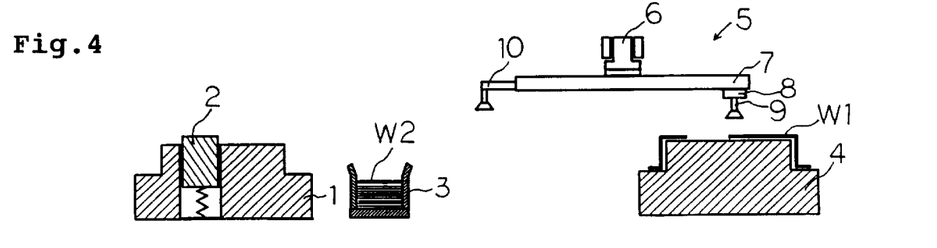
FIG. 4 is a side view illustrating a fourth step of the article conveying apparatus of the first embodiment of the present invention.

In a fourth step illustrated in FIG. 4, the first holding device 9 connected to the linearly reciprocating body 8 moves to a position over the lower die 4, and the first holding device 9 is caused to release the work W1. The work W1 is thereby set onto the lower die 4.

The work W2 remains in the stacker 3.

Through the above-described steps according to the first embodiment, while the work W1 held by the first holding device 9 is being conveyed from the lower die 1 to the lower die 4 in accordance with the motion of the linear shaft body 7 and the motion of the linearly reciprocating body 8 carrying the first holding device 9, the work W2 held by the second holding device 10 is synchronously conveyed from the pressurizing member 2 to the stacker 3 in accordance with the motion of the linear shaft body 7 supporting the second holding device 10.

Thus, the work W1 on the lower die 1 and the work W2 on the pressurizing member 2 are simultaneously transferred through a single action (a takeout-transfer action) of the linear shaft body 7 provided in the conveying apparatus 5.

Therefore, the operating time of the conveying apparatus 5 can be reduced in a case where two works W1, W2 are discharged from a single press machine and transferred to different locations (the stacker 3 and the lower die 4).

A second preferred embodiment of the present invention will be described with reference to FIGS. 7 to 12. Elements comparable to those of the first embodiment are represented by comparable reference characters in the drawings and will not be described again.

Figure 7:
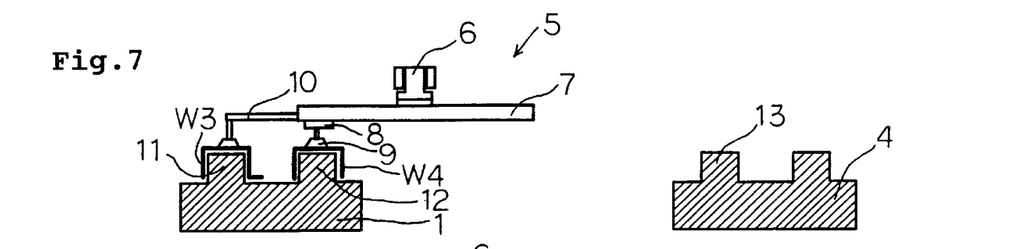
FIG. 7 is a side view of a portion of an article conveying apparatus of a second embodiment of the present invention, illustrating a first step of the apparatus.

Referring to FIG. 7, a lower portion of a press machine is constituted by a lower die 1 having a first forming portion 11 for forming a work W3 and a second forming portion 12 for forming a work W4.

The work W3 formed by the first forming portion 11 of the lower die 1 is transferred to the second forming portion 12 of the lower die 1, where it is pressed again.

Another lower die 4, disposed apart from the lower die 1, has a forming portion 13. The work W4 formed by the second forming portion 12 is moved onto the forming portion 13, where the work W4 is pressed.

The operation of the second embodiment of the present invention will be described below.

Figure 11:
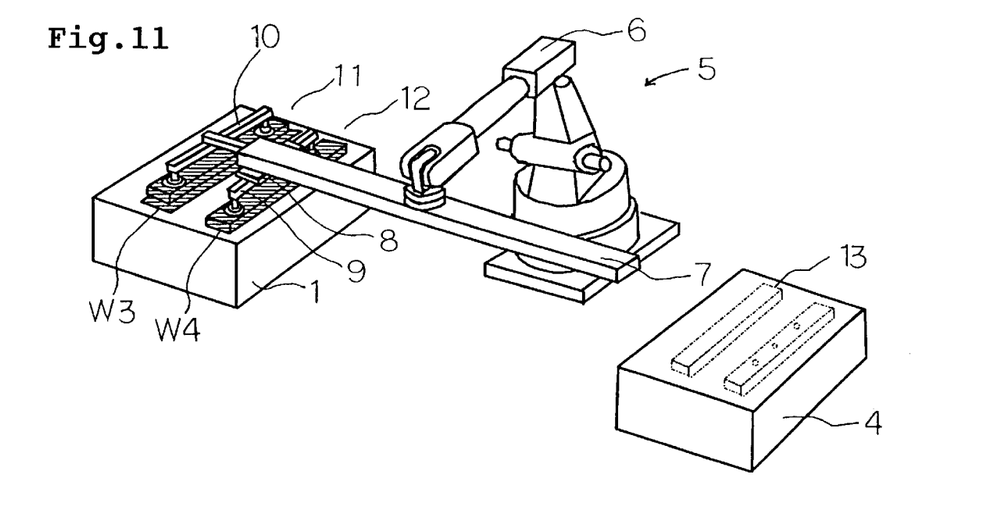
FIG. 11 is a perspective view of a portion of the article conveying apparatus of the second embodiment of the present invention, illustrating the first step thereof.

In a first step illustrated in FIG. 7 and FIG. 11, the conveying apparatus 5 is moved to a position above the lower die 1 by the multi-joint robot 6. The first holding device 9 connected to the linearly reciprocating body 8 holds the work W3, and the second holding device 10 connected to the linear shaft body 7 holds the work W4.

Figure 8:
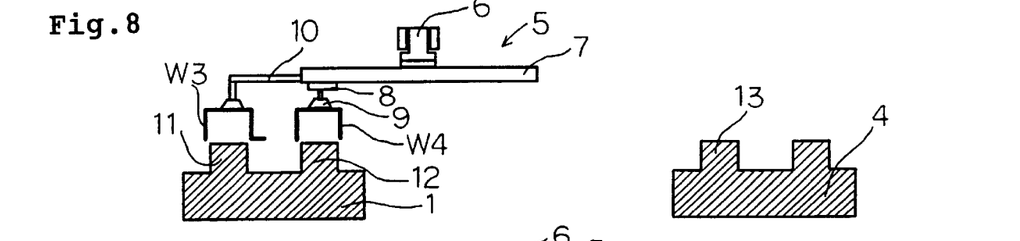
FIG. 8 is a side view illustrating a second step of the article conveying apparatus of the second embodiment of the present invention.

In a second step illustrated in FIG. 8, the conveying apparatus 5 is moved vertically upward.

Figure 9:
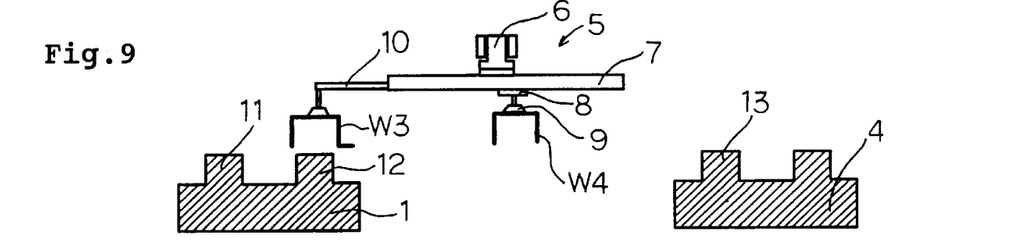
FIG. 9 is a side view illustrating a third step of the article conveying apparatus of the second embodiment of the present invention.

In a third step illustrated in FIG. 9, the linear shaft body 7 is moved toward the lower die 4 by the multi-joint robot 6 and, synchronously, the linearly reciprocating body 8 is moved relative to the linear shaft body 7, toward the lower die 4. The work W3 and the work W4 are conveyed toward the lower die 4.

When the second holding device 10 subsequently reaches a position over the second forming portion 12, the second holding device 10 is caused to release the work W3 on to the second forming position 12. At the time of release from the second holding device 10, the first holding device 9 connected to the linearly reciprocating body 8 continues holding the work W4. Thus, the time control of article holding and releasing actions of the first holding device 9 is different from the time control of article holding and releasing actions of the second holding device 10.

Figure 10:
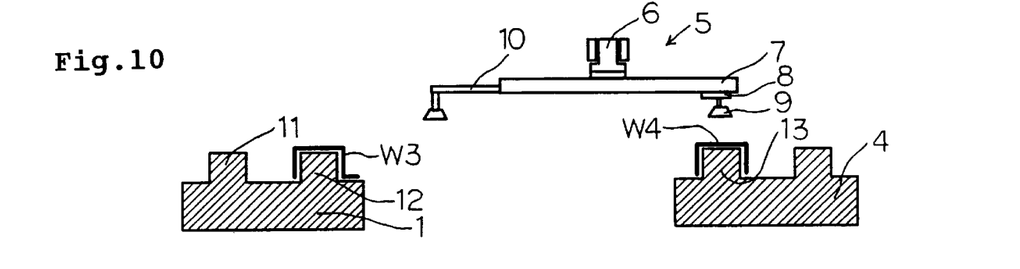
FIG. 10 is a side view illustrating a fourth step of the article conveying apparatus of the second embodiment of the present invention.
Figure 12:
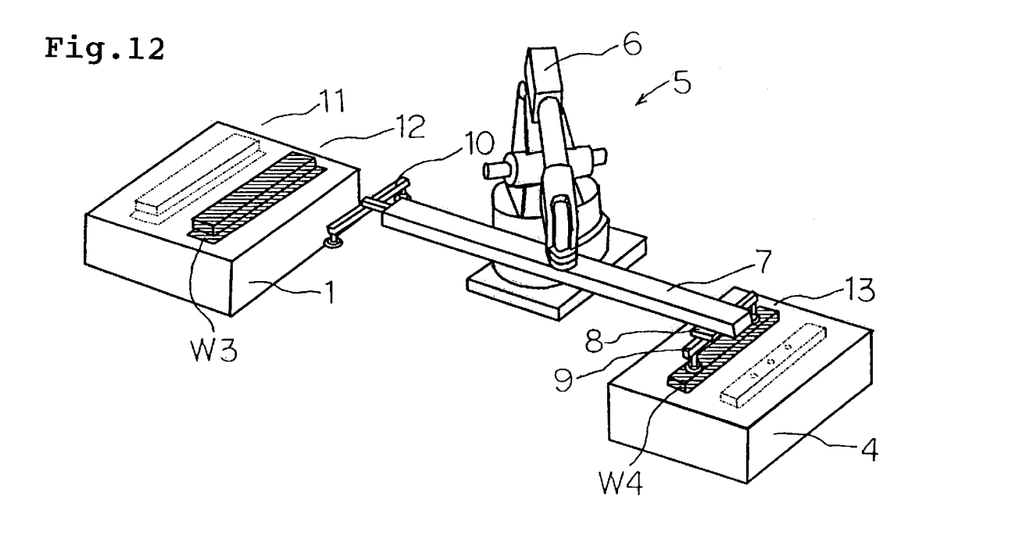
FIG. 12 is a perspective view illustrating the fourth step of the article conveying apparatus of the second embodiment of the present invention.

In a fourth step illustrated in FIG. 10 and FIG. 12, the first holding device 9 connected to the linearly reciprocating body 8 moves to a position over the lower die 4, and the first holding device 9 is caused to release the work W4. The work W4 is thereby set onto the lower die 4.

The work W3 remains on the second forming portion 12 of the lower die 1.

Through the above-described steps according to the second embodiment, while the work W3 held by the second holding device 10 is being conveyed from the first forming portion 11 of the lower die 1 to the second forming portion 12 of the lower die 1 in accordance with the linear shaft body 7 supporting the second holding device 10, the work W4 held by the first holding device 9 is synchronously conveyed from the second forming portion 12 of the lower die 1 to the forming portion 13 of the lower die 4 in accordance with the motion of the linear shaft body 7 and the motion of the linearly reciprocating body 8 carrying the first holding device 9.

Thus, the second forming portion 12 of the lower die 1 becomes vacant by removing the work W4 therefrom by the linear shaft body 7 driven by the multi-joint robot 6 and the linearly reciprocating body 8 moving along the linear shaft body 7, and the work W3 from the first forming portion 11 of the lower die 1 is transferred to the vacant second forming portion 12 of the lower die 1.

Therefore, it becomes possible to perform two pressing steps in a single press machine without providing a dedicated device, such as an in-die transfer device, in the lower die 1.

The second embodiment requires no increase in the dedicated equipment to the press machine and thus enables a reduction in the dedicated equipment costs.

While the article conveying apparatus of the present invention has been described with reference to the first and second embodiments, the present invention may be applied to other types of article conveying apparatuses without departing from the gist of the present invention.

For example, the work holding devices 9, 10 are not limited to devices employing suction cups. The work holding devices may use electromagnetic attraction or a mechanically clamping or holding mechanism or the like, as long as the work holding devices are able to hold articles.

Although, in the first embodiment, the stacker 3 is employed to store the work taken out of the press machine, it is also possible to provide a belt conveyor or the like instead of the stacker 3, in order to convey the work from the press machine to another step.

The complex-type article conveying apparatus of the present invention is able to simultaneously transfer the article W1 placed at the first location 1 and the article W2 placed at the third location 2 through a single action of the linear shaft body provided in the article conveying apparatus (a single takeout-transfer action). Therefore, the operating time of the inter-step conveying apparatus can be reduced in a case where two works are discharged from a press machine and transferred separately to different locations. The energy required for conveyance can also be reduced.

Furthermore, since the second location 12 in a press machine becomes vacant when the first article W4 is taken out by the linearly reciprocating body moving along the linear shaft body and the linear shaft body being moved by the external motion mechanism, the second article W3 at the first location 11 in the press machine can be moved to the vacant second location 12. Therefore, it becomes possible to perform two pressing steps in a single press machine without providing a dedicated device in the press machine or between dies. Thus, the dedicated equipment costs can be reduced.

Furthermore, the first holding device and the linearly reciprocating body are connected by locking a lock mechanism. The first holding device can be separated from the linearly reciprocating body by unlocking the lock mechanism. The second holding device and the linear shaft body are connected by locking another lock mechanism. The second holding device can be separated from the linear shaft body by unlocking the lock mechanisms. Therefore, replacement of the holding devices is facilitated, so that the general versatility of the article conveying apparatus is enhanced.

Further, while the article held by the first holding device is being conveyed, the other article is released from the second holding device to set it into a predetermined location. Therefore, it is possible to set one work to a desired position while holding and conveying another work.

Further, the positional relationship and sequence of the locations of works before and after conveyance are not limited to those disclosed in the first and second embodiments, that is, the locations of the works W1, W2, and W3, W4, but may be changed as desired according to the invention.

It is to be understood that the invention is not limited to the disclosed embodiments or constructions. To the contrary, the invention is intended to cover various modifications and equivalent arrangements included within the spirit and scope of the appended claims.

What is claimed is:

1. A complex-type article conveying apparatus comprising:

a linear shaft body movable by an external motion mechanism that operates to move the linear shaft body to any desired position in three dimensions and to rotate the linear shaft body by any desired angle in any direction;

a linearly reciprocating body movable along the linear shaft body;

a first holding device provided on the linearly reciprocating body, the first holding device being capable of holding an article to be conveyed; and a second holding device provided at an end of the linear shaft body, the second holding device being capable of holding an article to be conveyed, wherein synchronously with an operation in which an article that has been at a first location is held by the first holding device and moved to a second location in accordance with a motion of the linearly reciprocating body along the linear shaft body and a motion of the linear shaft body driven by the external motion mechanism, another article that has been at a third location is held by the second holding device and moved to a fourth location in accordance with the motion of the linear shaft body driven by the external motion mechanism, the first location, the second location, the third location and the fourth location being arranged non-equidistantly.

2. A complex-type article conveying apparatus according to claim 1, wherein the first holding device is provided on the linearly reciprocating body via a first detachable connection, and the second holding device is provided on the linear shaft body via a second detachable connection.

3. A complex-type article conveying apparatus according to claim 1, further comprising a controller that controls timing of article holding and releasing actions of the first holding device differently from timing of article holding and releasing actions of the second holding device.

4. A complex-type article conveying apparatus comprising:

a linear shaft body movable by an external motion mechanism that operates to move the linear shaft body to any defined position in three dimensions and to rotate the linear shaft body by any desired angle in any direction;

a linearly reciprocating body movable along the linear shaft body;

a first holding device provided on the linearly reciprocating body, the first holding device being capable of holding an article to be conveyed; and a second holding device provided at an end of the linear shaft body, the second holding device being capable of holding an article to be conveyed, wherein synchronously with an operation in which a first article that has been at a second location is held by the first holding device and moved to a third location in accordance with a motion of the linearly reciprocating body along the linear shaft body and a motion of the linear shaft body driven by the external motion mechanism, a second article that has been at a first location is held by the second holding device and moved in accordance with the motion of the linear shaft body driven by the external motion mechanism to the second location, which is vacant since the first article was held by the first holding device and removed by the conveying action of the linearly reciprocating body, the first location, the second location and the third location being arranged non-equidistantly on a continuous conveyance path.

5. A complex-type article conveying apparatus according to claim 4, wherein the first holding device is provided on the linearly reciprocating body via a first detachable connection, and the second holding device is provided on the linear shaft body via a second detachable connection.

6. A complex-type article conveying apparatus according to claim 4, further comprising a controller that controls timing of article holding and releasing actions of the first holding device differently from timing of article holding and releasing actions of the second holding device.

7. A complex-type article conveying apparatus comprising:

a linear shaft body movable by an external motion mechanism that operates to move the linear shaft body to any desired position in three dimensions and to rotate the linear shaft body by any desired angle in anv direction;

a linearly reciprocating body movable along the linear shaft body;

a first holding device provided on the linearly reciprocating body, the first holding device being capable of holding an article to be conveyed; and a second holding device provided at an end of the linear shaft body, the second holding device being capable of holding an article to be conveyed.

8. A complex-type article conveying apparatus comprising:

a linear shaft body movable by an external motion mechanism;

a linearly reciprocating body movable along the linear shaft body;

a first holding device provided on the linearly reciprocating body, the first holding device being capable of holding an article to be conveyed;

a second holding device provided at an end of the linear shaft body, the second holding device being capable of holding an article to be conveyed; and a controller that controls timing of article holding and releasing actions of the first holding device differently from timing of article holding and releasing actions of the second holding device;

wherein synchronously with an operation in which an article that has been at a first location is held by the first holding device and moved to a second location in accordance with a motion of the linearly reciprocating body along the linear shaft body and a motion of the linear shaft body driven by the external motion mechanism, another article that has been at a third location is held by the second holding device and moved to a fourth location in accordance with the motion of the linear shaft body driven by the external motion mechanism, the first location, the second location, the third location and the fourth location being arranged non-equidistantly.

9. A complex-type article conveying apparatus comprising:

a linear shaft body movable by an external motion;

a linearly reciprocating body movable along the linear shaft body;

a first holding device provided on the linearly reciprocating body, the first holding device being capable of holding an article to be conveyed;

a second holding device provided at an end of the linear shaft body, the second holding device being capable of holding an article to be conveyed; and a controller that controls timing of article holding and releasing actions of the first holding device differently from timing of article holding and releasing actions of the second holding device;

wherein synchronously with an operation in which a first article that has been at a second location is held by the first holding device and moved to a third location in accordance with a motion of the linearly reciprocating body along the linear shaft body and a motion of the linear shaft body driven by the external motion mechanism, a second article that has been at a first location is held by the second holding device and moved in accordance with the motion of the linear shaft body driven by the external motion mechanism to the second location, which is vacant since the first article was held by the first holding device and removed by the conveying action of the linearly reciprocating body, the first location, the second location and the third location being arranged non-equidistantly on a continuous conveyance path.

* * * * *